United States Patent [19]

Muraki et al.

[11] Patent Number: 5,326,810

[45] Date of Patent: * Jul. 5, 1994

[54] RUBBER COMPOSITIONS FOR TIRE TREADS OF DRIVING STABILITY

[75] Inventors: Takao Muraki, Hiratsuka; Kinya Kawakami, Kanagawa; Masayoshi Daio, Hiratsuka, all of Japan

[73] Assignee: The Yokohama Rubber Co., Ltd., Japan

[*] Notice: The portion of the term of this patent subsequent to Jan. 12, 2010 has been disclaimed.

[21] Appl. No.: 902,799

[22] Filed: Jun. 24, 1992

Related U.S. Application Data

[63] Continuation of Ser. No. 814,084, Dec. 24, 1991, abandoned, which is a continuation of Ser. No. 663,807, Mar. 4, 1991, abandoned, which is a continuation of Ser. No. 363,025, Jun. 8, 1989, abandoned.

[30] Foreign Application Priority Data

Jun. 16, 1988 [JP] Japan .................................. 63-146891

[51] Int. Cl.$^5$ .................................................. C08K 3/04

[52] U.S. Cl. ............................................ 524/496; 524/495

[58] Field of Search ............................ 524/495, 496, 847

[56] References Cited

U.S. PATENT DOCUMENTS

| | | | |
|---|---|---|---|
| 4,644,988 | 2/1987 | Ahmad | 524/496 |
| 4,748,168 | 5/1988 | Kawakami et al. | 524/495 |
| 4,748,199 | 5/1988 | Takiguchi | 524/495 |
| 4,786,677 | 11/1988 | Nakai | 524/496 |

*Primary Examiner*—Paul R. Michl
*Assistant Examiner*—Peter Szekely
*Attorney, Agent, or Firm*—Finnegan, Henderson, Farabow, Garrett & Dunner

[57] ABSTRACT

Rubber compositions are disclosed for automobile tire treads. One or more SBR rubbers of higher than −40° C. in Tg are combined with carbon black of specified $N_2SA$, DBP, $\Delta$DBP and $\Delta$Dst qualities. The resulting composition has enhanced tan $\delta$ at 0° C. and 60° C., breaking strength, breaking energy and abrasion resistance characteristics.

3 Claims, No Drawings

RUBBER COMPOSITIONS FOR TIRE TREADS OF DRIVING STABILITY

This application is a continuation of application Ser. No. 07/814,084, filed Dec. 24, 1991, now abandoned, which is a continuation of application Ser. No. 07/663,807, filed Mar. 4, 1991, now abandoned, which is a continuation of application Ser. No. 07/363,025, filed Jun. 8, 1989, now abandoned.

BACKGROUND OF THE INVENTION

1. Field of the Invention

This invention relates to rubber compositions particularly for use in tread portions of automobile tires.

2. Prior Art

To cope with the advent of sports cars of high performance, a great concern has been directed to the driving stability of tires at high speeds. Tread rubbers have to this end been developed which are so formulated as to exhibit increased tan $\delta$ at 60° C. This particular quality is closely associated with tire gripping, i.e. frictional resistance between the tire tread and the road surface while in tire running. Improved tire gripping is generally dominated by increased tan $\delta$ at 60° C.

Taking the criticality of tan $\delta$ in view, many attempts have been made with elastomeric materials such as styrene-rich or vinyl-rich styrene-butadiene rubbers (SBR) of high glass transition temperatures (Tg). Alternatively, large amounts of carbon black have been incorporated in base rubbers. Because of their high Tg temperatures, however, such SBR rubbers will usually depend in nature upon temperature and thus tend to invite reduced hardness at elevated temperature. This in turn leads not only to insufficient rigidity over a temperature range of 20–100° C. within which to run the tire but also to inadequate breaking strength and poor abrasion resistance, meaning that those known SBR rubbers will not warrant commercial application. Too much carbon black fails to uniformly disperse in a given rubber mix and if not, will in most cases render the mix susceptible to great hysteresis loss and hence objectionable heat buildup with the results that various necessary dynamic properties get impaired.

SUMMARY OF THE INVENTION

It has now been found that tread rubber compositions of enhanced mechanical and dynamic characteristics can be obtained by the use of SBR rubbers of selected Tg temperatures combined with carbon blacks of specified physical properties. The present invention seeks to provide a novel rubber composition for tire treads which excels in breaking strength, breaking energy and abrasion resistance with tan $\delta$ held at an increased level at both 0° C. and 60° C., thus contributing to improved driving stability on wet and dry roads.

More specifically, as will readily become apparent from the following description, the invention provides a rubber composition for use in tire treads which comprises a base rubber in an amount of 100 parts by weight, the base rubber resulting from at least one styrene-butadiene rubber having a glass transition temperature of higher than −40° C. or from a blend thereof with a different diene rubber, and a carbon black in an amount of 50–200 parts by weight, the carbon black having an $N_2SA$ of 140–160 $m^2/g$ as defined by nitrogen adsorption surface area, a DBP of more than 120 ml/100 g as defined by dibutyl phthalate adsorption, a $\Delta DBP$ of larger than 30 ml/100 g as determined from the difference of DBP subtracted by 24M 4 DBP and a $\Delta Dst$ of smaller than 50 m$\mu$ as defined by aggregate size distribution of Dst diameter.

DETAILED DESCRIPTION OF THE INVENTION

Rubber compositions contemplated under the present invention are comprised essentially of a selected class of base rubbers and a selected type of carbon blacks.

Base rubbers used herein may be chosen from SBR rubbers with a Tg temperature higher than −40° C. They may be used alone or in combination, or may be blended with one of different diene rubbers. Such SBR rubbers are obtainable by emulsion or solution polymerization. Specific examples of diene rubbers include natural rubber (NR), polyisoprene rubber (IR), butadiene rubber (BR), butyl rubber (IIR), halogenated butyl rubber (Cl-IIR, Br-IIR) and the like.

According to one important aspect of the invention, carbon blacks should meet certain $N_2SA$, DBP, $\Delta DBP$ and $\Delta Dst$ requirements. The details as regards the methods of such qualities will appear below.

$N_2SA$ is defined by Nitrogen Adsorption Surface Area ($m^2/g$). Measurement is made in accordance with ASTM D-3037-78, "Standard Methods of Testing Carbon Black-Surface Area by Nitrogen Adsorption," Method C.

DBP is defined by Dibutyl Phthalate Adsorption (ml/100 g). JIS K-6221 (1982) is followed by "Method of Testing Carbon Black for Rubbers", Section 6.1.2 (1), Method A.

$\Delta DBP$ is determined from the difference of DBP subtracted by 24M 4 DBP. This latter adsorption is measured by the procedure stipulated in ASTM D-3493.

$\Delta Dst$ is defined by Aggregate Size Distribution of Dst Diameter. This is intended to determine the particle size of precipitated carbon black powders taking advantage of the principle that particulate material of larger Stokes' diameter can be diffused at a higher rate. Centrifugal classification is effected on a disc centrifuge manufactured by Joyce Loebl Co., England. A carbon black sample is dried and precision-weighed, followed by addition of an aqueous solution containing 20% by volume of ethanol and surfactant, thereby preparing a dispersion concentrated to 5 mg/100 cc. Complete dispersion is ultrasonically accomplished. Into the centrifuge set at 8,000 rpm are put 10 ml of a spindle liquid in distilled water, subsequently 0.5 ml of a buffer in 20% by volume of ethanol and finally 0.5–1.0 ml of the carbon black dispersion through a syringe. Centrifugation is thereafter initiated to draw a distribution curve of aggregates. $\Delta Dst$ is determined as the half value width by halving the maximum absorbance on the resulting histogram.

The carbon black according to the invention should range in $N_2SA$ from 140 to 160 $m^2/g$. This quality if smaller than 140 $m^2/g$ would make the final rubber composition less resistant to abrasion and if larger than 160 $m^2/g$ would induce objectionable heat generation.

DBP should be greater than 120 ml/100 g as smaller adsorptions would not be effective in improving abrasion resistance and driving stability.

$\Delta DBP$ should exceed 30 ml/100 g, and failure to observe this adsorption would invite insufficient tan $\delta$ at high temperature and hence unstable driveability.

ΔDst should not be more than 50 mμ, departures from the limit being responsible for fast wear and inadequate driving.

The amount of the carbon black to be added should be in the range of 50-200 parts by weight based on 100 parts by weight of the base rubber. Smaller amounts would show no appreciable rise in abrasion resistance, while greater amounts would make carbon black particles difficult to uniformly disperse into the base rubber and thus provide a physically poor rubber composition.

Tire treads, formed from the composition of the invention, can be greatly improved with respect to tan δ at 0° C. and 60° C. and hence tire gripping, breaking strength, breaking energy and abrasion resistance.

The composition of the invention may be incorporated, where desired, with various other additives commonly accepted in the industry. They may be selected for instance from vulcanization agents such as sulfur, vulcanization accelerators, vulcanization activators, antioxidants, tackifiers, softeners, fillers and the like.

The following examples are provided to further illustrate the invention. All the formulations are indicated by weight parts unless otherwise noted.

INVENTIVE EXAMPLES 1-5 AND COMPARATIVE EXAMPLES 1-15

Different rubber compositions were formulated and prepared, as seen from Table 3, with the SBR rubbers and carbon blacks shown in Tables 1 and 2, respectively. The compositions were kneaded and vulcanized at 148° C. for 30 minutes.

All the vulcanizates were examined for tan δ at 0° C and 60° C., tensile strength on break ($T_B$), breaking energy and abrasion resistance under the conditions given below and with the results shown also in Table 3.

tan δ

Measurement was made on a viscoelasticity spectrometer (Iwamoto Seisakusho Co., Japan) at a strain of 10±2%, a frequency of 20 Hz and temperatures of 0° and 60° C. This quality was regarded as a measure of tire gripping on a wet road at 0° C. and on a dry road at 60° C. The larger the value, the higher tire gripping.

Tensile Strength ($T_B$)

This strength was determined to adjudge the breaking strength of the test vulcanizate. JIS K-6301 was followed. The higher the value, the stronger breaking.

Breaking Energy

Evaluation was made by the area required for breaking to take place on a stress-strain curve. The higher, the better.

Abrasion Resistance

Goodrich's Pico type abrasion machine was used. A wear was calculated from the following equation.

$$\frac{\text{wear of vulcanizate in Comparative Example 1}}{\text{wear of vulcanizate in each other run}} \times 100\%$$

As is apparent from the tabulated data, the compositions according to the invention are highly satisfactory in respect of all the characteristics tested. This is sharply contrastive to Comparative Examples 1-15 in which SBR rubbers or carbon blacks are outside the scope of the invention.

TABLE 1

| rubber | Tg (°C.) | styrene content (%) | property |
|---|---|---|---|
| SBR-1 | −30 | 35 | emulsion-polymerized 37.5 wt. pt. oil-extended |
| SBR-2 | −21 | 45 | emulsion-polymerized 37.5 wt. pt. oil-extended |
| SBR-3 | −10 | 40 | solution-polymerized 37.5 wt. pt. oil-extended |
| SBR-4 | −51 | 23.8 | emulsion-polymerized 37.5 wt. pt. oil-extended Nipol 1712 (Nippon Zeon Co., Japan) |

TABLE 2

| carbon black | $N_2SA$ ($m^2/g$) | DBP (ml/100 g) | ΔDBP (ml/100 g) | ΔDst (mμ) |
|---|---|---|---|---|
| CB-1 | 145 | 116 | 17 | 76 |
| CB-2 | 145 | 129 | 26 | 49 |
| CB-3 | 141 | 131 | 31 | 48 |
| CB-4 | 155 | 130 | 27 | 50 |
| CB-5 | 153 | 133 | 33 | 53 |
| CB-6 | 152 | 135 | 40 | 40 |
| CB-7 | 178 | 139 | 42 | 50 |

CB-1: SAF carbon black, Dia Black A, Mitsubishi Chemical Industries, Japan
CB-2: comparative
CB-3: inventive
CB-4: comparative
CB-5: comparative
CB-6: inventive
CB-7: comparative

TABLE 3

| Run | Comparative Examples 1 | Comparative Examples 2 | Inventive Example 1 | Comparative Examples 3 | Comparative Examples 4 | Inventive Example 2 | Comparative Examples 5 | Comparative Examples 6 | Comparative Examples 7 | Inventive Example 3 | Comparative Examples 8 | Comparative Examples 9 |
|---|---|---|---|---|---|---|---|---|---|---|---|---|
| formulation | | | | | | | | | | | | |
| SBR-1 | 137.5 | 137.5 | 137.5 | 137.5 | 137.5 | 137.5 | 137.5 | | | | | |
| SBR-2 | | | | | | | | 137.5 | 137.5 | 137.5 | | |
| SBR-3 | | | | | | | | | | | 137.5 | 137.5 |
| SBR-4 | | | | | | | | | | | | |
| CB-1 | 120 | | | | | | | | | | | |
| CB-2 | | 120 | | | | | | | | | | |
| CB-3 | | | 120 | | | | | | | | | |
| CB-4 | | | | 120 | | | | | 120 | | 120 | |
| CB-5 | | | | | 120 | | | | | 120 | | 120 |
| CB-6 | | | | | | 120 | | 120 | | 120 | | |
| CB-7 | | | | | | | 120 | | | | | |
| zinc oxide | 3 | 3 | 3 | 3 | 3 | 3 | 3 | 3 | 3 | 3 | 3 | 3 |
| stearic acid | 2 | 2 | 2 | 2 | 2 | 2 | 2 | 2 | 2 | 2 | 2 | 2 |
| antioxidant 6C | 3 | 3 | 3 | 3 | 3 | 3 | 3 | 3 | 3 | 3 | 3 | 3 |
| aromatic oil | 82.5 | 82.5 | 82.5 | 82.5 | 82.5 | 82.5 | 82.5 | 82.5 | 82.5 | 82.5 | 82.5 | 82.5 |
| accelerator TT | 1.5 | 1.5 | 1.5 | 1.5 | 1.5 | 1.5 | 1.5 | 1.5 | 1.5 | 1.5 | 1.5 | 1.5 |

TABLE 3-continued

| | | | | | | | | | | | | |
|---|---|---|---|---|---|---|---|---|---|---|---|---|
| sulfur vulcanizate | 1.5 | 1.5 | 1.5 | 1.5 | 1.5 | 1.5 | 1.5 | 1.5 | 1.5 | 1.5 | 1.5 | 1.5 |
| tan δ at 0° C. | 1.340 | 1.345 | 1.375 | 1.300 | 1.304 | 1.342 | 1.257 | 1.203 | 1.207 | 1.248 | 1.299 | 1.305 |
| tan δ at 60° C. | 0.541 | 0.570 | 0.620 | 0.653 | 0.655 | 0.704 | 0.655 | 0.660 | 0.655 | 0.686 | 0.609 | 0.605 |
| $T_B$ (kg/cm$^2$) | 105 | 110 | 115 | 112 | 110 | 118 | 89 | 119 | 115 | 125 | 94 | 95 |
| breaking energy (kg·cm) | 310 | 320 | 385 | 325 | 330 | 380 | 215 | 340 | 335 | 390 | 195 | 200 |
| abrasion resistance (%) | 100.0 | 103.0 | 105.0 | 107.0 | 100.0 | 110.0 | 103.0 | 105.0 | 86.3 | 10.60 | 82.0 | 82.0 |

| | Run | Inventive Example 4 | Comparative Examples | | | | | | Inventive Example 5 |
|---|---|---|---|---|---|---|---|---|---|
| | | | 10 | 11 | 12 | 13 | 14 | 15 | |
| | formulation | | | | | | | | |
| | SBR-1 | | | | | | | | |
| | SBR-2 | | | | | | | | |
| | SBR-3 | 137.5 | | | | 137.5 | 96.25 | 96.25 | 96.25 |
| | SBR-4 | | 137.5 | 137.5 | 137.5 | | 30.00 | 30.00 | 30.00 |
| | CB-1 | | | | | | | | |
| | CB-2 | | | | | | | | |
| | CB-3 | | | | | | | | |
| | CB-4 | | 120 | | | | 120 | | |
| | CB-5 | | | 120 | | | | 120 | |
| | CB-6 | 120 | | | 120 | | | | 120 |
| | CB-7 | | | | | 120 | | | |
| | zinc oxide | 3 | 3 | 3 | 3 | 3 | 3 | 3 | 3 |
| | stearic acid | 2 | 2 | 2 | 2 | 2 | 2 | 2 | 2 |
| | antioxidant 6C | 3 | 3 | 3 | 3 | 3 | 3 | 3 | 3 |
| | aromatic oil | 82.5 | 82.5 | 82.5 | 82.5 | 82.5 | 93.75 | 93.75 | 93.75 |
| | accelerator TT | 1.5 | 1.5 | 1.5 | 1.5 | 1.5 | 1.5 | 1.5 | 1.5 |
| | sulfur | 1.5 | 1.5 | 1.5 | 1.5 | 1.5 | 1.5 | 1.5 | 1.5 |
| | vulcanizate | | | | | | | | |
| | tan δ at 0° C. | 1.367 | 1.100 | 1.105 | 1.095 | 1.130 | 1.105 | 1.121 | 1.255 |
| | tan δ at 60° C. | 0.714 | 0.540 | 0.545 | 0.580 | 0.570 | 0.573 | 0.569 | 0.680 |
| | $T_B$ (kg/cm$^2$) | 109 | 130 | 132 | 138 | 120 | 85 | 80 | 103 |
| | breaking energy (kg·cm) | 290 | 410 | 415 | 430 | 370 | 125 | 120 | 240 |
| | abrasion resistance (%) | 100.0 | 110 | 103.0 | 112 | 68 | 95.0 | 92.0 | 108.0 |

What is claimed is:

1. A rubber composition for use in tire treads which comprises:
   (a) 100 parts by weight of a base rubber consisting essentially of one or more styrene-butadiene rubbers having a glass transition temperature higher than −40° C., or a blend of one or more of said styrene-butadiene rubbers with a diene rubber selected from the group consisting of natural rubber, polyisoprene rubber, butadiene rubber, butyl rubber and halogenated butyl rubber; and
   (b) 50-200 parts by weight of a carbon black having an N$_2$SA of 140-160 m$^2$/g as defined by nitrogen adsorption surface area, a DBP of more than 120 ml/100 g as defined by dibutyl phthalate adsorption, a ΔDBP of larger than 30 ml/100 g as determined by the difference of DBP subtracted by 24M 4 DBP and a ΔDst of smaller than 50 μm as defined by aggregate size distribution of Dst diameter.

2. The rubber composition of claim 1, wherein said diene rubber is butadiene rubber.

3. The rubber composition of claim 2, wherein said butadiene rubber constitutes about one-fourth, by weight, of said base rubber.

* * * * *